United States Patent
Balzer et al.

(10) Patent No.: US 8,416,397 B2
(45) Date of Patent: Apr. 9, 2013

(54) DEVICE FOR A MOTOR VEHICLE USED FOR THE THREE-DIMENSIONAL DETECTION OF A SCENE INSIDE OR OUTSIDE SAID MOTOR VEHICLE

(75) Inventors: Dirk Balzer, Rochester, MI (US); Guido Becker, Losheim/See (DE)

(73) Assignees: IEE International Electronics & Engineering S.A., Echternach, Luxembourg (DE); Adam Opel AG, Russelheim (DE)

( * ) Notice: Subject to any disclaimer, the term of this patent is extended or adjusted under 35 U.S.C. 154(b) by 0 days.

(21) Appl. No.: 10/545,360

(22) PCT Filed: Feb. 12, 2004

(86) PCT No.: PCT/EP2004/050124
§ 371 (c)(1), (2), (4) Date: Apr. 5, 2006

(87) PCT Pub. No.: WO2004/072677
PCT Pub. Date: Aug. 26, 2004

(65) Prior Publication Data
US 2006/0222207 A1    Oct. 5, 2006

(30) Foreign Application Priority Data
Feb. 13, 2003   (DE) .................................. 103 05 861

(51) Int. Cl.
*G01C 3/08* (2006.01)

(52) U.S. Cl.
USPC ..................... 356/4.01; 356/5.01; 356/5.04

(58) Field of Classification Search .......... 356/5.01–5.15
See application file for complete search history.

(56) References Cited

U.S. PATENT DOCUMENTS

| | | | |
|---|---|---|---|
| 5,283,622 A | 2/1994 | Ueno et al. | |
| 6,133,988 A * | 10/2000 | Rheme et al. | 356/3.01 |
| 6,323,941 B1 * | 11/2001 | Evans et al. | 356/4.01 |
| 6,492,935 B1 | 12/2002 | Higuchi | |
| 6,678,394 B1 * | 1/2004 | Nichani | 382/103 |
| 6,922,234 B2 * | 7/2005 | Hoffman et al. | 356/141.1 |
| 2001/0003168 A1 * | 6/2001 | Breed et al. | 701/45 |
| 2002/0057195 A1 * | 5/2002 | Yamamura | 340/435 |
| 2002/0149761 A1 * | 10/2002 | Saccomanno | 356/5.03 |

FOREIGN PATENT DOCUMENTS

| | | |
|---|---|---|
| DE | 26 49 274 A1 | 10/1977 |
| EP | 0 717 288 A1 | 6/1996 |
| JP | 04-276585 | 10/1992 |
| JP | 07-333339 | 12/1995 |
| JP | 10160835 | 6/1998 |
| JP | 2001099930 | 4/2001 |
| JP | 2002006041 | 1/2002 |
| JP | 2002314992 | 10/2002 |

* cited by examiner

*Primary Examiner* — Timothy A Brainard
(74) *Attorney, Agent, or Firm* — McCormick, Paulding & Huber LLP

(57) ABSTRACT

An apparatus in a motor vehicle for spatial detection of a scene inside and/or outside the motor vehicle has a LIDAR sensor, which is coupled to an electronic detection device, and an image sensor, which is connected to an image processing device for recording and evaluation of images of the scene. The detection device and the image processing device are coupled to a computer in order to determine spatial data of the scene.

14 Claims, 1 Drawing Sheet

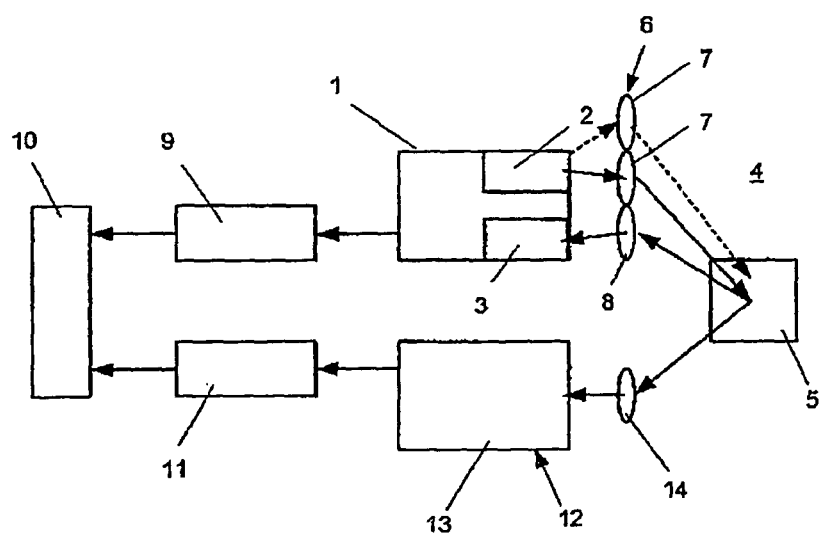

DEVICE FOR A MOTOR VEHICLE USED FOR THE THREE-DIMENSIONAL DETECTION OF A SCENE INSIDE OR OUTSIDE SAID MOTOR VEHICLE

CROSS-REFERENCE TO RELATED APPLICATIONS

This application is entitled to the benefit of International Application No. PCT/EP2004/050124 filed on Feb. 12, 2004, and German Patent Application No. 103 05 861.3 filed on Feb. 13, 2003.

FIELD OF THE INVENTION

The invention relates to an apparatus in a motor vehicle for spatial detection of the scene inside and/or outside the motor vehicle, having a LIDAR sensor, which is coupled to an electronic detection device, and having an image sensor, which is coupled to an image processing device, for recording an evaluation of images of the scene.

BACKGROUND OF THE INVENTION

DE 199 28 915 A1 discloses a method by means of which the visual range in the field of view of a motor vehicle can be determined exactly, so that the driver can be caused to adapt his driving style with the aid of the visual range information. In this case, a monocular video sensor measures the contrast of an object which is detected by a radar or LIDAR sensor, and determines the visual range from the measurement values which are produced by the radar or LIDAR sensor and by the monocular video sensor. As an alternative to this, the distance to the at least one object and its contrast are measured by means of a binocular video sensor, and the visual range is then determined from the contrast and distance measurement values. Apart from the contrast measurement, no further evaluation is carried out on the image data recorded by the video sensor. Furthermore, it has been found to be disadvantageous that the LIDAR sensors which are suitable for relatively large measurement ranges lose position resolution as the distance to an object increases, thus resulting in a deterioration in the object identification.

OBJECTS AND SUMMARY OF THE INVENTION

The invention is based on the object of providing an apparatus of the type mentioned initially, which links the advantageous characteristics of the two sensors to one another in order to compensate for their disadvantageous characteristics.

According to the invention, the object is achieved by the detection device and the image processing device being coupled to a computer in order to determine spatial data of the scene.

The LIDAR sensor and its associated detection device can be used in a known manner to determine distance data between the motor vehicle and an object within the scene and, in addition, to produce an image of the scene which allows estimation of the data from the LIDAR sensor. In addition to gray scale and color information, the computer also allocates Cartesian coordinates to pixels of the object, thus resulting in an imaging three-dimensional measurement method. The use of the LIDAR sensor and of the image sensor coupled via the computer in and on the motor vehicle ensures unambiguous detection and classification of objects in the scene, in particular of other motor vehicles.

In order to evaluate object data in the far range with respect to the motor vehicle, the computer preferably combines the data from the detection device for the LIDAR sensor with two-dimensional image data from the image processing device. In order to evaluate the two-dimensional image data, the computer requires only a relatively small amount of computation power and compensates for the problem resulting from the decreasing accuracy as the distance to the object from the motor vehicle increases in the case of object identification using the LIDAR sensor by means of the object identification, which is also reliable in the far range, of the image processing device, which receives corresponding image data from the image sensor.

As object data in the near range with respect to the motor vehicle, the computer preferably receives three-dimensional image data which has been recorded by the image sensor, which is in the form of a 3D camera and which has been evaluated by the image processing device. In the near range of objects with respect to the motor vehicle, there is thus no need to combine the distance data from the LIDAR sensor with the image data obtained by the image processing device. All of the required data can be determined from the images recorded by the 3D camera and is available directly, without any additional computer power.

The computer expediently transmits the data of the scene via a vehicle network to safety and/or assistance systems in the motor vehicle. Such safety and/or assistance systems require the data of the scene in the motor vehicle and in the vicinity of the motor vehicle for estimation of a hazard potential and of activation, associated with this, of security or safety devices which result, for example, in deliberate inflation of an airbag or in the initiation of belt tighteners. Furthermore, assistance systems in the motor vehicle provide visual and/or audible assistance to the driver, for example when parking in a parking gap.

According to one advantageous refinement to the invention, the 3D camera operates on the basis of the time-of-flight (TOF) method. A non-scanning, imaging 3D camera such as this works on an array of so-called demodulation pixels. Each of these demodulation pixels allows not only the measurement of the background intensity but also the individual arrival time of radio-frequency-modulated scene illumination. The functional principle of demodulation pixels is based on the CCD (Charge Coupled Device) principle, which allows the transport, storage and accumulation of optically generated charge carriers in defined locally limited regions on the image sensor. Distance and reflectivity information of the scene to be measured can be extracted from each demodulation pixel from a received optical signal. The time-of-flight methods can be carried out using the pulse or phase measurement method.

A laser for the LIDAR sensor preferably has optics for a near range and a far range. The optics for the near range and the far range are expediently formed by double optics or two lenses which can be driven separately. This allows the laser to be focused, with its angular resolution being increased, and the detection of objects in the scene to be improved.

According to one advantageous development of the idea of the invention, the laser for the LIDAR sensor operates with radiation in the infrared band, and is used as a light source for the image sensor. The transmitted radiation may be modulated, for example, by means of a signal generator so that it can be used for illumination of the scene that is recorded by a 3D camera. If the laser is in the form of a light source, there is no need to provide a separate light source for the image sensor.

It is self-evident that the features which have been mentioned above and those which are still to be explained in the following text can be used not only in the respectively steady combination but also in other combinations. The scope of the present invention is defined only by the claims.

BRIEF DESCRIPTION OF THE DRAWINGS

The invention will be explained in more detail in the following text using an exemplary embodiment and with reference to the associated drawing.

FIG. 1 is a schematic illustration of the apparatus, in accordance with one embodiment of the present invention.

DETAILED DESCRIPTION OF THE INVENTION

The apparatus which is arranged within a motor vehicle comprises a LIDAR sensor 1 which is formed essentially from a laser 2 that transmits in the infrared band and a receiving device 3 for the reflective radiation. For focusing of a scene 4 to be scanned by the laser 2 and having at least one object 5, the laser 2 has associated optics 6 for the near range and the far range, comprising two lenses 7 which can be driven separately, with one of the lenses 7 providing scattering of the radiation in the near range, and the other lens 7 providing focusing for the radiation in the far range. The receiving device 3 has an associated optical device 8 for reception of the radiation which is reflected from the object 5, from fog or from other particles in the scene 4. The LIDAR sensor 1 is coupled to an electronic detection device 9, which calculates the distance between the motor vehicle and the object 5 on the basis of the time difference between the transmission of the radiation from the laser 2 and the reception of the back-scattered radiation. The detection device 9 is connected to a computer 10, to which it supplies the calculated distance data of the scene 4.

In order to determine spatial data of the scene 4, the computer 10 is connected to an image processing device 11, which is in turn connected to an image sensor 12. The image sensor 12, which is in the form of a 3D camera 13, uses its objective 14 to record images of the scene 4, which the image processing device 11 evaluates in terms of gray-scale and color information on the basis of objects 5 that occur, and classifies the detected object 5. Furthermore, the association of distance data is also possible using the time-of-flight method. In this case, the laser 2 for the LIDAR sensor 1 transmits modulation radiation in the infrared band, and is thus used as a light source for the image sensor 12, in order to illuminate the scene 4.

The computer 10 determines the spatial data of the scene 4 on the basis of the available distance data and image data. In this case, when objects 5 are detected in the near range with respect to the motor vehicle, it uses the three-dimensional data from the image processing device 11 and, in the case of objects 5 in the far range with respect to the motor vehicle, it combines the distance data from the detection device 9 with the image data from the image processing device 11. In addition, the computer takes account of the visual range information which is determined by means of the LIDAR sensor 1 and which makes it possible, for example, to draw conclusions from fog and/or dirt particles in the scene 4. The computer 10 makes the spatial data of the scene 4 available for further use via a vehicle network, which is not illustrated, to its safety and assistance systems in the motor vehicle.

LIST OF REFERENCE SYMBOLS
1. LIDAR sensor
2. Laser
3. Receiving device
4. Scene
5. Object
6. Optics
7. Lens
8. Optical device
9. Detection device
10. Computer
11. Image processing device
12. Image sensor
13. 3D camera
14. Objective

The invention claimed is:

1. An apparatus of a motor vehicle for spatial acquisition of a scene inside or outside the motor vehicle, said apparatus comprising a LIDAR sensor which is coupled to an electronic detection device, and an image sensor which is connected to an image processing device for recording and evaluation of images of the scene, wherein said detection device and said image processing device are coupled to a computer for determining spatial data of the scene, and wherein said image sensor is formed by a 3D camera for recording three-dimensional image data, which operates according to the time-of-flight (TOF) method.

2. The apparatus as claimed in claim 1, wherein said computer combines the data from the detection device of the LIDAR sensor with two-dimensional image data from the image processing device in order to evaluate object data in the far range with respect to the motor vehicle.

3. The apparatus as claimed in claim 1, wherein said computer uses as object data in the near range with respect to the motor vehicle three-dimensional image data, which has been recorded by said 3D camera and which has been evaluated by said image processing device.

4. The apparatus as claimed in claim 1, wherein the computer transmits the data of the scene via a vehicle network to safety and/or assistance systems of the motor vehicle.

5. The apparatus as claimed in claim 1, wherein a laser of the LIDAR sensor has optics for a near range and a far range.

6. The apparatus as claimed in claim 5, wherein the optics for the near range and the far range are formed by double optics or two lenses which are to be driven separately.

7. The apparatus as claimed in claim 1, wherein the laser of the LIDAR sensor operates with radiation in the infrared band, and serves as a light source for the image sensor.

8. An apparatus of a motor vehicle for spatial acquisition of a scene inside and outside the motor vehicle, said apparatus comprising a LIDAR sensor which is coupled to an electronic detection device, and an image sensor which is connected to an image processing device for recording and evaluation of images of the scene, wherein said detection device and said image processing device are coupled to a computer for determining spatial data of the scene, and wherein said image sensor is formed by a 3D camera for recording three-dimensional image data, which operates according to the time-of-flight (TOF) method.

9. The apparatus as claimed in claim 8, wherein said computer combines the data from the detection device of the LIDAR sensor with two-dimensional image data from the image processing device in order to evaluate object data in the far range with respect to the motor vehicle.

10. The apparatus as claimed in claim 8, wherein said computer uses as object data in the near range with respect to the motor vehicle three-dimensional image data, which has been recorded by said 3D camera and which has been evaluated by said image processing device.

11. The apparatus as claimed in claim 8, wherein the computer transmits the data of the scene via a vehicle network to safety and/or assistance systems of the motor vehicle.

12. The apparatus as claimed in claim 8, wherein a laser of the LIDAR sensor has optics for a near range and a far range.

13. The apparatus as claimed in claim 12, wherein the optics for the near range and the far range are formed by double optics or two lenses which are to be driven separately.

14. The apparatus as claimed in claim 8, wherein the laser of the LIDAR sensor operates with radiation in the infrared band, and serves as a light source for the image sensor.

* * * * *